US010234994B2

(12) United States Patent
Kitagawa

(10) Patent No.: US 10,234,994 B2
(45) Date of Patent: Mar. 19, 2019

(54) TOUCH-PANEL-EQUIPPED DISPLAY DEVICE

(71) Applicant: SHARP KABUSHIKI KAISHA, Sakai, Osaka (JP)

(72) Inventor: Daiji Kitagawa, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/557,408

(22) PCT Filed: Mar. 10, 2016

(86) PCT No.: PCT/JP2016/057685
§ 371 (c)(1),
(2) Date: Sep. 11, 2017

(87) PCT Pub. No.: WO2016/143880
PCT Pub. Date: Sep. 15, 2016

(65) Prior Publication Data
US 2018/0032208 A1 Feb. 1, 2018

(30) Foreign Application Priority Data
Mar. 11, 2015 (JP) ................. 2015-048274

(51) Int. Cl.
G06F 3/041 (2006.01)
G02F 1/1333 (2006.01)
(Continued)

(52) U.S. Cl.
CPC ........ G06F 3/0418 (2013.01); G02F 1/13338 (2013.01); G06F 3/044 (2013.01);
(Continued)

(58) Field of Classification Search
CPC combination set(s) only.
See application file for complete search history.

(56) References Cited

U.S. PATENT DOCUMENTS

2012/0056835 A1   3/2012   Choo et al.
2013/0335374 A1   12/2013  Sugita et al.
(Continued)

FOREIGN PATENT DOCUMENTS

JP   2014-071626 A   4/2014
JP   5462845 B2      4/2014
(Continued)

Primary Examiner — Jennifer Mehmood
Assistant Examiner — Deeprose Subedi
(74) Attorney, Agent, or Firm — ScienBiziP, P.C.

(57) ABSTRACT

A technique is provided that enables to reduce false detection on a touch panel, without limiting the time when the display panel is driven. In a touch-panel-equipped display device 1, a display control unit 30 sequentially selects gate lines, and data signals are supplied to data lines, whereby a display panel 20 is driven. A transmission circuit 410 supplies a pulse signal to transmission electrode portions 11 at timings based on a horizontal synchronization signal. A controller 400 detects a contact position on the touch panel 10, based on output signals output from a reception circuit that correspond to capacitances between the transmission electrode portions 11 and reception electrode portions 12. The controller 400 adjusts the timings of supplying the pulse signal from the transmission circuit 410 so that the point of time when the voltage of the pulse signal changes should not coincide with the period when noise of the display device due to the supply of data signals occurs.

4 Claims, 9 Drawing Sheets

(51) Int. Cl.
 *G09G 3/20* (2006.01)
 *G06F 3/044* (2006.01)
 *G09G 3/36* (2006.01)

(52) U.S. Cl.
 CPC ............. *G09G 3/20* (2013.01); *G09G 3/2003* (2013.01); *G09G 3/3648* (2013.01); *G09G 3/3677* (2013.01); *G09G 3/3688* (2013.01); *G06F 2203/04111* (2013.01); *G09G 2300/0426* (2013.01); *G09G 2310/08* (2013.01); *G09G 2354/00* (2013.01)

(56) References Cited

U.S. PATENT DOCUMENTS

2014/0092061 A1* 4/2014 Akai .................... G06F 3/0418
 345/174
2014/0146010 A1 5/2014 Akai et al.
2014/0333676 A1* 11/2014 Fujii .................... G09G 3/2003
 345/690

FOREIGN PATENT DOCUMENTS

JP 2014-106864 A 6/2014
WO 2012/117928 A1 9/2012

\* cited by examiner

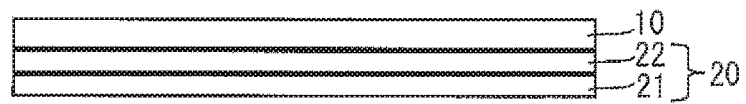
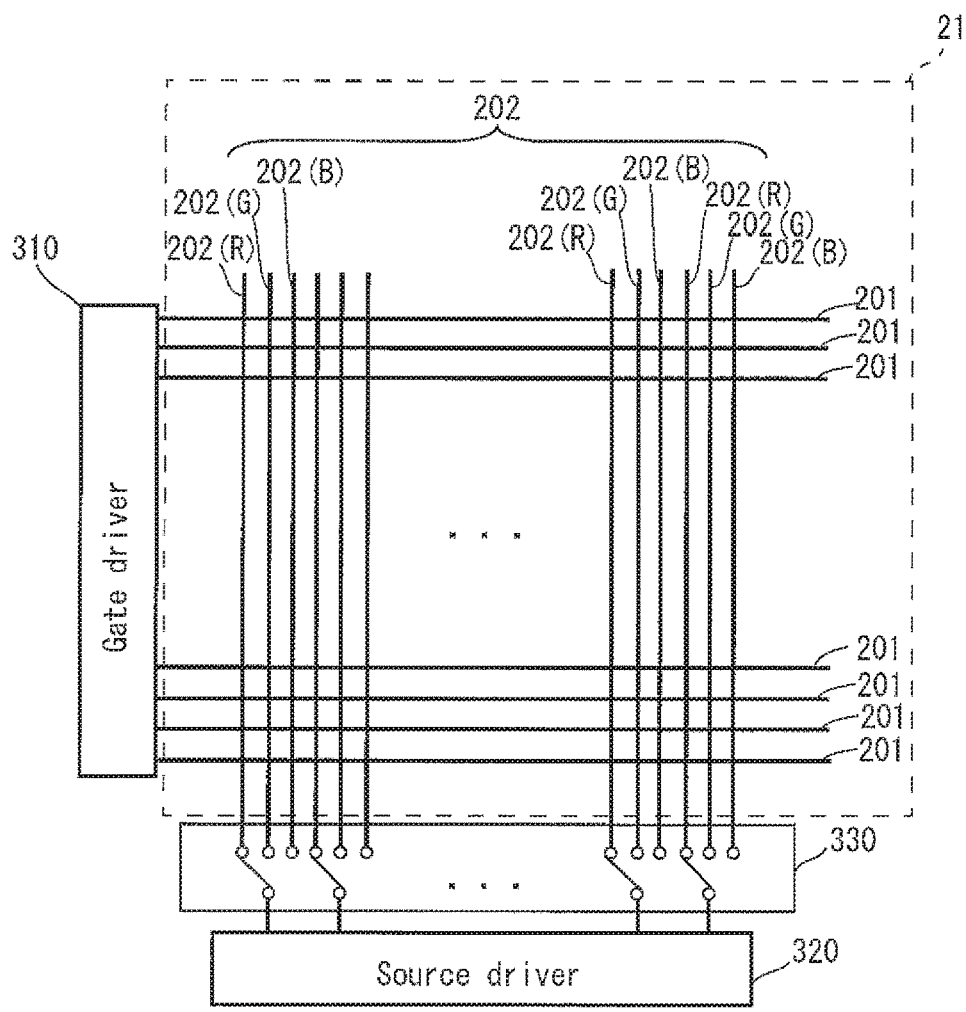

| 2 | 3 | 4 | 2 | 2 | 3 | 4 |
|---|---|---|---|---|---|---|
| 3 | 2 | 3 | 3 | 3 | 2 | 3 |
| 4 | 3 | 4 | 4 | 4 | 3 | 4 |
| 2 | 5 | 4 | 2 | 2 | 5 | 4 |
| 4 | 3 | 3 | 2 | 2 | 3 | 4 |
| 2 | 3 | 2 | 3 | 3 | 2 | 3 |
| 3 | 2 | 3 | 4 | 4 | 3 | 4 |
| 4 | 3 | 4 | 2 | 2 | 5 | 4 |
| 2 | 5 | 2 | 4 | 4 | 3 | 3 |
| 2 | 3 | 4 | 2 | 2 | 3 | 4 |
| 3 | 2 | 3 | 3 | 3 | 2 | 3 |
| 4 | 3 | 4 | 4 | 4 | 3 | 4 |
| 2 | 5 | 4 | 2 | 2 | 5 | 4 |
| 4 | 3 | 3 | 4 | 4 | 3 | 3 |

Fig. 8A

| 2 | 3 | 4 | 2 | 2 | 3 | 4 |
|---|---|---|---|---|---|---|
| 3 | 2 | 3 | 3 | 3 | 2 | 3 |
| 4 | 3 | 4 | 4 | 4 | 3 | 4 |
| 2 | 5 | 4 | 2 | 2 | 5 | 4 |
| 4 | 3 | 3 | 2 | 2 | 3 | 4 |
| 2 | 3 | 520 | 525 | 3 | 2 | 3 |
| 3 | 2 | 515 | 508 | 4 | 3 | 4 |
| 4 | 3 | 4 | 2 | 2 | 5 | 4 |
| 2 | 5 | 2 | 4 | 4 | 3 | 3 |
| 2 | 3 | 4 | 2 | 2 | 3 | 4 |
| 3 | 2 | 3 | 3 | 3 | 2 | 3 |
| 4 | 3 | 4 | 4 | 4 | 3 | 4 |
| 2 | 5 | 4 | 2 | 2 | 5 | 4 |
| 4 | 3 | 3 | 4 | 4 | 3 | 3 |

Fig. 8B

| 50 | 35 | 47 | 50 | 50 | 35 | 47 |
|---|---|---|---|---|---|---|
| 55 | 46 | 38 | 55 | 55 | 46 | 38 |
| 62 | 53 | 61 | 62 | 62 | 53 | 61 |
| 48 | 50 | 46 | 48 | 48 | 50 | 46 |
| 50 | 35 | 47 | 50 | 50 | 35 | 47 |
| 55 | 46 | 38 | 55 | 55 | 46 | 38 |
| 62 | 53 | 61 | 62 | 62 | 53 | 61 |
| 48 | 50 | 46 | 48 | 48 | 50 | 46 |
| 50 | 35 | 47 | 50 | 50 | 35 | 47 |
| 50 | 35 | 50 | 35 | 50 | 35 | 47 |
| 55 | 46 | 55 | 46 | 55 | 46 | 38 |
| 62 | 53 | 62 | 53 | 62 | 53 | 61 |
| 48 | 50 | 48 | 50 | 48 | 50 | 46 |
| 50 | 35 | 50 | 35 | 50 | 35 | 47 |

Fig. 8C

TOUCH-PANEL-EQUIPPED DISPLAY DEVICE

TECHNICAL FIELD

The present invention relates to a touch-panel-equipped display device.

BACKGROUND ART

A touch-panel-equipped display device in which a touch panel of the electrostatic capacitance type and a display panel are integrated has been known conventionally. The electrostatic-capacitance-type touch panel integrated with the display panel tends to be influenced by noise that occurs due to the driving of the display panel when a touched position is detected, and this can lead to false detection. Patent Document 1 described below discloses a technique of performing the driving of the display panel and the touch panel during one frame in such a manner that the display panel and the touch panel are driven alternately in a time-division manner, so that the detection on the touch panel is performed without influences by noise of the display panel.

PRIOR ART DOCUMENT

Patent Document

Patent Document 1: Japanese Patent No. 5462845

SUMMARY OF THE INVENTION

Problem to be Solved by the Invention

In the case of Patent Document 1, the time when the display panel is driven is limited, as compared with the case where the display panel and the touch panel are driven in parallel, and the time of driving the display panel decreases. As the number of pixels in the display panel increases, therefore, the difficulty of the development of the display panel driving technique increases, and labor hours needed for the development increase.

It is an object of the present invention to provide a technique that enables to reduce false detection on the touch panel, without limiting the time when the display panel is driven.

Means to Solve the Problem

A touch-panel-equipped display device according to the present invention includes: a display panel including a plurality of gate lines and a plurality of data lines that intersect with each other; a display control unit that sequentially selects the gate lines, and supplies data signals to the data lines; a touch panel that is arranged so as to be stacked on the display panel, and includes a plurality of transmission electrodes and a plurality of reception electrodes that intersect with each other; a pulse supply unit that supplies a pulse signal to the transmission electrodes at timings based on a horizontal synchronization signal; a detection unit that detects capacitances between the transmission electrodes and the reception electrodes, and detects a contact position on the touch panel based on the detected capacitances; and an adjustment unit that adjusts the timings so that a point of time when a voltage of the pulse signal changes should not coincide with a period when the noise of the display panel occurs due to the supply of the data signals.

Effect of the Invention

The configuration of the present invention makes it possible to reduce false detection on the touch panel, without limiting the time when the display panel is driven.

BRIEF DESCRIPTION OF DRAWINGS

FIG. 2 is a schematic diagram illustrating a cross-sectional structure of the touch panel and the display panel illustrated in FIG. 1.

FIG. 3 is a schematic diagram illustrating a schematic configuration of an active matrix substrate illustrated in FIG. 2.

FIG. 8A illustrates exemplary plane data indicating mean values of capacitances in one frame in a state in which no conductive body is in contact with the touch panel.

FIG. 8B illustrates exemplary plane data indicating mean values of capacitances in one frame in a state in which a conductive body is in contact with the touch panel.

FIG. 8C illustrates exemplary plane data indicating mean values of capacitances in one frame in a state in which no conductive body is in contact with the touch panel, in a case of being influenced by noise of the display panel.

Figure 10:
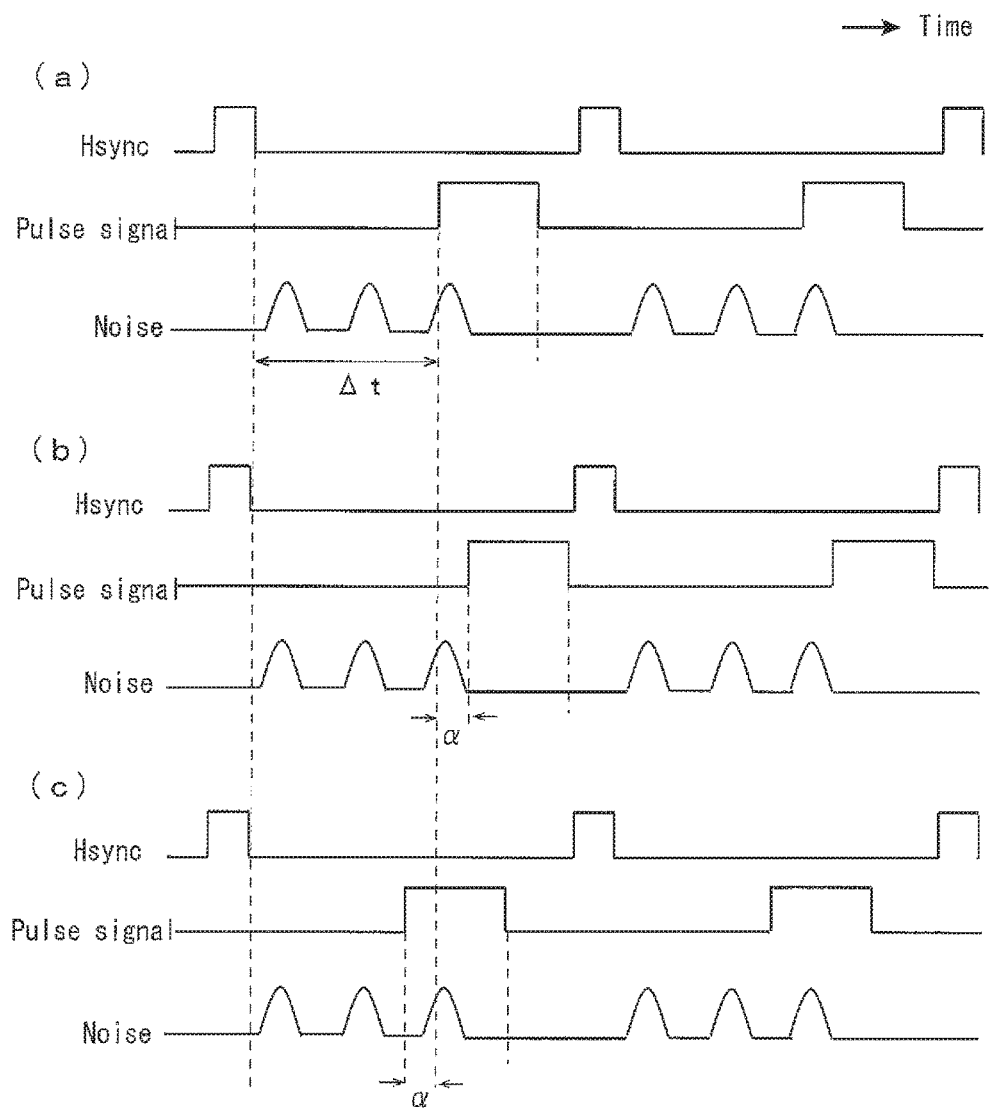

(a) of FIG. 10 illustrates exemplary waveforms of a pulse signal in the initial setting and noise. (b) of FIG. 10 is a waveform diagram in a state in which the timing of generating the pulse signal with respect to the noise of the display panel is delayed, as compared with the timing in the initial setting. (c) of FIG. 10 is a waveform diagram in a state in which the timing of generating the pulse signal with respect to the noise of the display panel is advanced, as compared with the timing in the initial setting.

MODE FOR CARRYING OUT THE INVENTION

A touch-panel-equipped display device according to one embodiment of the present invention includes: a display panel including a plurality of gate lines and a plurality of data lines that intersect with each other; a display control unit that sequentially selects the gate lines, and supplies data signals to the data lines; a touch panel that is arranged so as to be stacked on the display panel, and includes a plurality of transmission electrodes and a plurality of reception electrodes that intersect with each other; a pulse supply unit that supplies a pulse signal to the transmission electrodes at timings based on a horizontal synchronization signal; a detection unit that detects capacitances between the transmission electrodes and the reception electrodes, and detects a contact position on the touch panel based on the detected capacitances; and an adjustment unit that adjusts the timings so that a point of time when a voltage of the pulse signal changes should not coincide with a period when the noise of the display panel occurs due to the supply of the data signals (the first configuration).

According to the first configuration, the display panel includes a plurality of gate lines and a plurality of data lines that intersect with each other. The gate lines are sequentially selected by the display control unit, and data signals are supplied to the data lines from the display control unit. The touch panel includes a plurality of transmission electrodes and a plurality of reception electrodes that intersect with each other. At predetermined timings based on the horizontal synchronization signal, a pulse signal is supplied from the pulse supply unit to the transmission electrodes. The supply of the pulse signal to the transmission electrode causes the capacitances between the transmission electrodes and the reception electrodes to be detected by the detection unit. The timings when the pulse signal is supplied are adjusted so that the point of time when the voltage of the pulse signal changes should not coincide with a period when the noise of the display panel occurs due to the supply of the data signals. With this configuration, even if the display panel and the touch panel are caused to operate in parallel, the detection of a contact position on the touch panel is not influenced by noise of the display panel caused by the writing of data signals, whereby false detection of a contact position can be reduced. Further, since the timings for causing the display panel to operate is not limited, a high-definition display panel can be used, without an increase in labor hours needed for the development.

The second configuration may be the first configuration further characterized in that the adjustment unit detects that the point of time when the voltage of the pulse signal changes coincides with the period when the noise of the display panel occurs, based on the capacitances detected by the detection unit, and adjusts the timings. In the case of the second configuration, even in a case where the period when the noise of the display panel occurs is shifted, the timings when the pulse signal is supplied can be adjusted so that the point of time when the voltage of the pulse signal changes should not coincide with the period when the noise of the display panel occurs, whereby false detection on the touch panel can be prevented.

The third configuration may be the second configuration further characterized in that, in a case where a ratio of mean values of capacitances exceeding a threshold value among those at points of intersections between the transmission electrodes and the reception electrodes in one frame is equal to or more than a predetermined ratio, the adjustment unit detects that the point of time when the voltage of the pulse signal changes coincides with the period when the noise of the display panel occurs, and advances or delays the timings by a certain time. When a conductive body such as a finger is in contact with the touch panel, the capacitance of the portion in contact changes locally; in contrast, in a case of being influenced by noise of the display panel, the capacitance changes in a wider range. The third configuration, therefore, makes it possible to detect noise of the display panel, distinguishing the same from a state where a conductive body such as a finger is in contact with the touch panel.

The fourth configuration may be any one of the first to third configurations further characterized in that the data signals are data signals each of which corresponds to any one of a plurality of colors, and the display control unit supplies the data signals of the plurality of colors in such a manner that the data signals in one horizontal scanning period are time-divided depending on the color. With the fourth configuration, the number of lines for connecting the data lines to the display control unit can be decreased.

The fifth configuration may be any one of the first to fourth configurations further characterized in that the display panel is a liquid crystal panel.

The following description describes embodiments of the present invention in detail, while referring to the drawings. Identical or equivalent parts in the drawings are denoted by the same reference numerals, and the descriptions of the same are not repeated.

Overall Configuration

Figure 1:
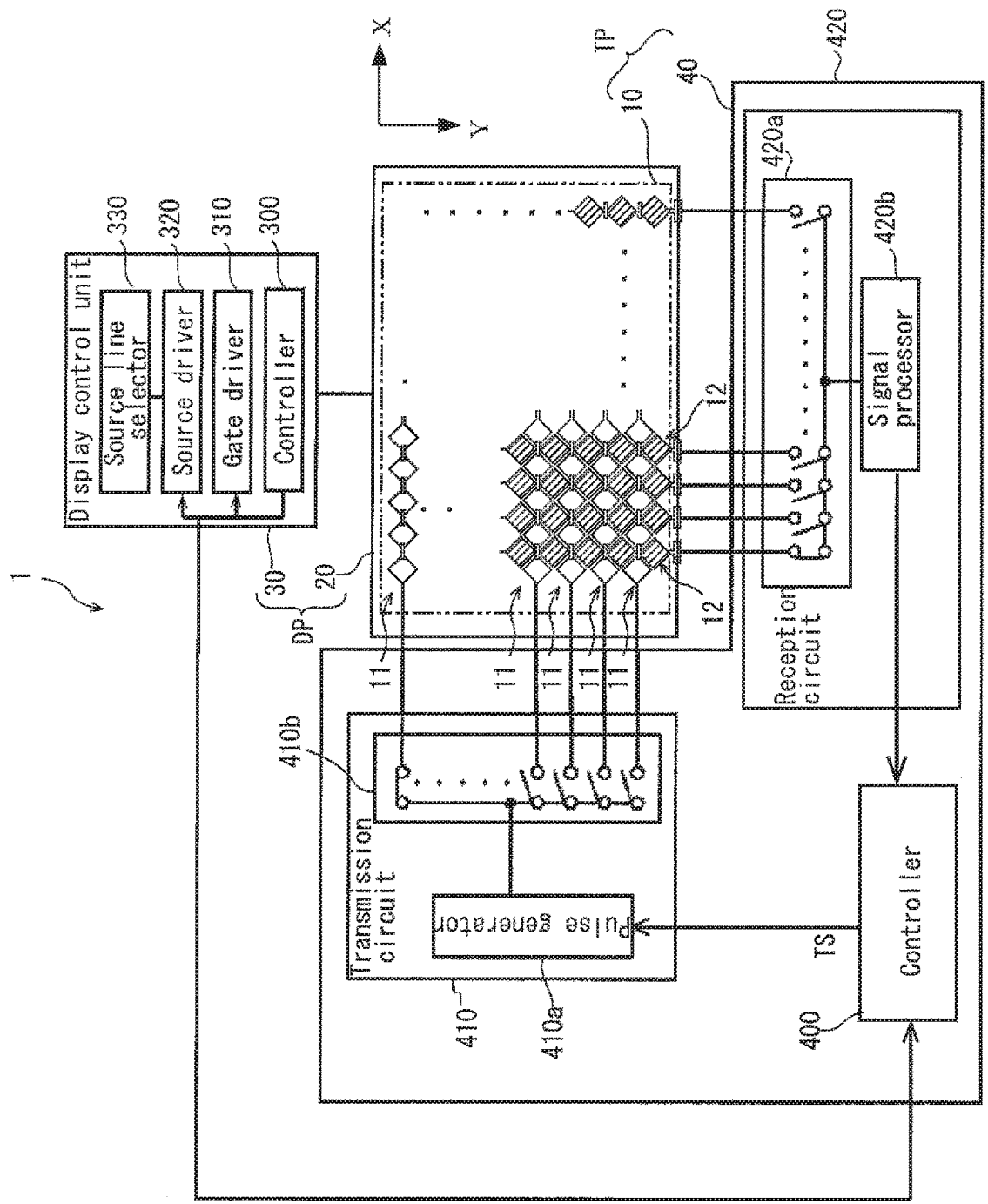
FIG. 1 is a schematic diagram illustrating a schematic configuration of a touch-panel-equipped display device according to an embodiment.

FIG. 1 is a schematic diagram illustrating a schematic configuration of a touch-panel-equipped display device according to the present embodiment. The touch-panel-equipped display device 1 includes a touch panel part TP and a display part DP. The touch panel part TP includes a touch panel 10 and a touch panel control unit 40. The display part DP includes a display panel 20 and a display control unit 30.

FIG. 2 is a schematic diagram illustrating a cross-sectional structure of the touch panel 10 and the display panel 20. As illustrated in FIG. 2, the touch panel 10 is arranged over the display panel 20 so that the display area of the display panel 20 and the sensing area of the touch panel 10 should coincide, and a pair of polarizing plates (not shown) are provided so that the touch panel 10 and the display panel 20 are interposed therebetween.

The touch panel 10 is, for example, an electrostatic-capacitance-type touch panel. The touch panel 10 detects a change in a capacitance at a position where a conductive body such as a finger is brought into contact with the sensing area of the touch panel 10, under the control by the touch panel control unit 40.

The touch panel control unit 40 includes a controller 400, a transmission circuit 410, and a reception circuit 420. The touch panel control unit 40 outputs a pulse signal to the touch panel 10 at a predetermined timing, and detects a contact position of a conductive body based on a change in a capacitance on the touch panel 10.

The display panel 20 is formed with, for example, a liquid crystal panel. The display panel 20 displays an image in the display area of the display panel 20 under the control by the display control unit 30.

The display control unit 30 includes a controller 300, a gate driver 310, a source driver 320, and a source line selector 330. The display control unit 30 drives the display panel 20, to cause the display panel 20 to display an image. The following description describes details of respective parts of the display part DP and the touch panel part TP.

Configuration of Display Section

As illustrated in FIG. 2, the display panel 20 includes an active matrix substrate 21 and a counter substrate 22, and has a liquid crystal layer (not shown) between these substrates. Further, though the illustration is omitted, a backlight is provided on a back side of the active matrix substrate 21.

On the counter substrate 22, a black matrix, a common electrode, and color filters of three colors of red (R), green (G), blue (B) are formed (illustration of these is omitted).

The following description describes configurations of the active matrix substrate 21 and respective parts connected with the active matrix substrate 21. FIG. 3 is a schematic diagram illustrating a schematic configuration of the active matrix substrate 21.

The active matrix substrate 21 includes a plurality of gate lines 201 and a plurality of source lines 202 that intersect with each other. In each pixel surrounded by the gate lines 201 and the source lines 202, at a position in the vicinity of intersection between the gate line 201 and the source line 202, a switching element (not shown) connected with the gate line 201 and the source line 202 is provided. Further, at each pixel, a pixel electrode (not shown) connected with the switching element in the pixel is provided.

The color filters of R, G, and B in the counter substrate 22 are arrayed in the order of R, G, and B along the direction in which the gate lines 201 extend, and each pixel displays an image corresponding to any one of the colors of R, G, and B.

The gate driver 310 is connected with the gate line 201, and sequentially applies a voltage indicating a selected state to the gate lines 201, based on a horizontal synchronization signal supplied from the controller 300 at a predetermined frequency (for example 60 Hz), thereby scanning the gate lines 201.

The source driver 320 is connected with the source line 202 selected by the source line selector 330. The source driver 320 supplies data signals indicating colors corresponding to the pixels, respectively, during each horizontal scanning period, by source shared driving (SSD).

The source line selector 330 includes switching elements (not illustrated) connected with the source lines 202, respectively. The source line selector 330 selects the source line 202 by controlling the respective switching elements, and switches the source line 202 connected with the source driver 320.

Figure 4:
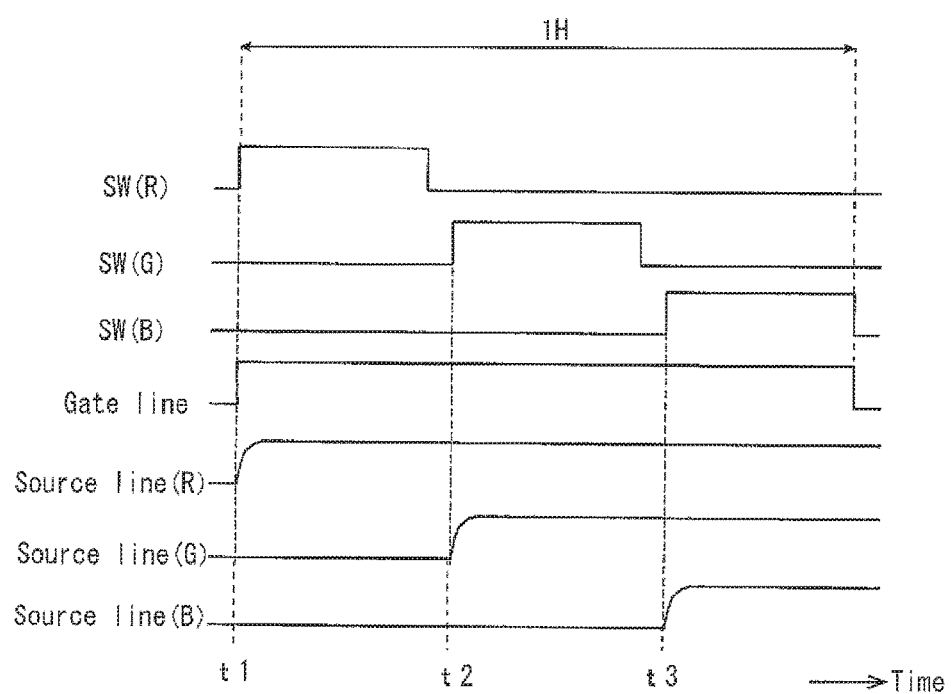
FIG. 4 is a timing chart illustrating the writing of data signals of respective colors of R, G, and B during one horizontal scanning period.

FIG. 4 is a timing chart illustrating the writing of data signals of respective colors of R, G, and B during one horizontal scanning period. "SW(R)", "SW(G)", and "SW(B)" in FIG. 4 indicate control signals supplied when the source line selector 330 selects the source line 202. "SW(R)" indicates a control signal for the switching elements connected with the source lines 202 to which the data signal of R is supplied (hereinafter referred to as the "source lines 202(R)"). "SW(G)" indicates a control signal for the switching elements connected with the source lines 202 to which the data signal of G is supplied (hereinafter referred to as the "source line 202(G)"). "SW(B)" indicates a control signal for the switching elements connected with the source lines 202 to which the data signal of B is supplied (hereinafter referred to as the "source line 202(B)").

As illustrated in FIG. 4, during one horizontal scanning period (1H) while one gate line 201 is selected, the potentials of SW(R), SW(G), and SW(B) rise to the High level alternately in this order for a certain set period of time, whereby the source line 202(R), the source line 202(G), and the source line 202(B) are sequentially connected with the source driver 320.

More specifically, at time t1 in FIG. 4, when the potential of SW(R) rises to the High level, the source line 202(R) is connected with the source driver 320. During this period, the potentials of SW(R), SW(G), and SW(B) are at the Low level, whereby the source lines 202(G) and 202(B) are not connected with the source driver 320. With this, the data signal indicating R is supplied to the source line 202(R), and the data signal is held by the source line 202(R) until the one horizontal scanning period ends.

Subsequently, the potential of SW(R) shifts to the Low level, and at time t2, the potential of SW(G) rises to the High level. Then, the source line 202(G) and the source driver 320 are connected, whereas the source lines 202(R) and 202(B) are not connected with the source driver 320. Then, the data signal indicating G is supplied to the source line 202(G), and the data signal is held by the source line 202(G) until the one horizontal scanning period ends.

Subsequently, the potential of SW(G) shifts to the Low level, and at time t3, the potential of SW(B) rises to the High level. Then, the source line 202(B) and the source driver 320 are connected, whereas the source lines 202(R) and 202(G) are not connected with the source driver 320. Then, the data signal indicating B is supplied from the source driver 320 to the source line 202(B), and the data signal is held by the source line 202(B) until the one horizontal scanning period ends.

In this way, while one gate line 201 is selected, a data signal is written in the pixel having the switching element connected to the gate line 201, in such a manner that the data signals are sequentially written in the order of R, G, and B.

Configuration of Touch Panel Part

As illustrated in FIG. 1, the touch panel 10 includes a plurality of transmission electrode portions 11 and reception electrode portions 12 that intersect with each other, on the substrate of the touch panel 10.

Figure 5:
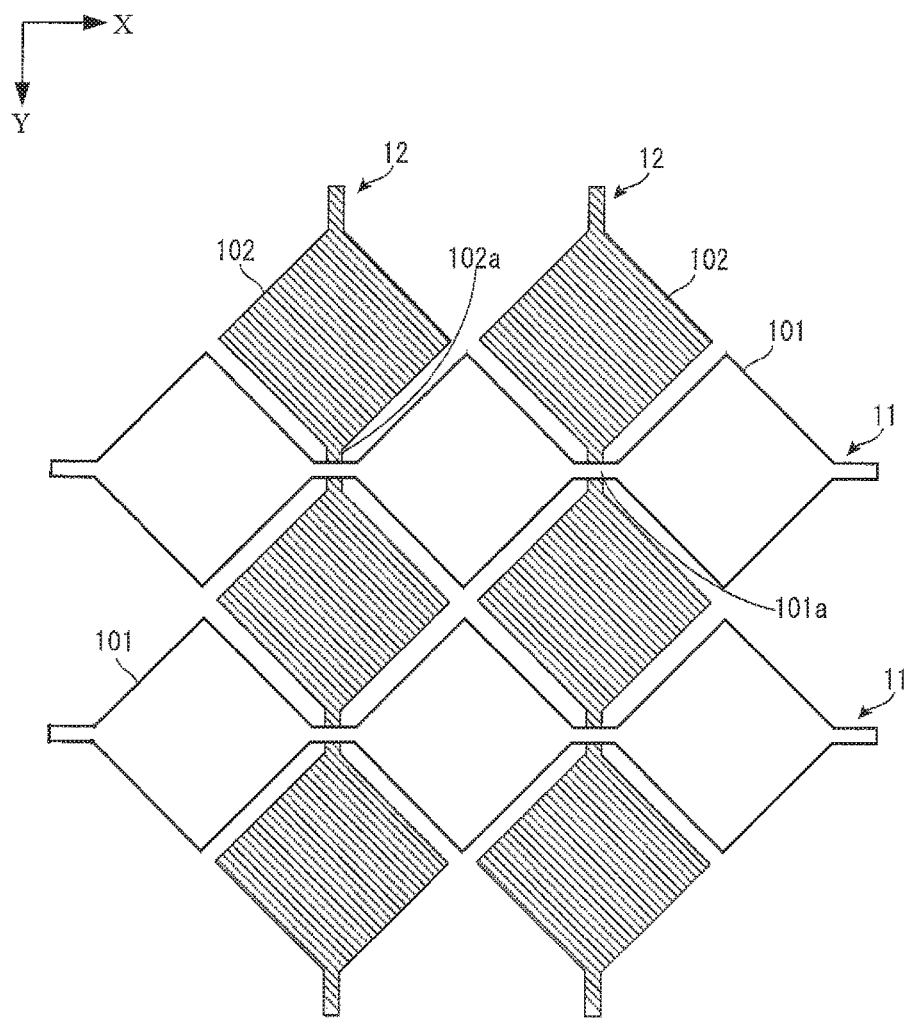
FIG. 5 is an enlarged schematic diagram illustrating a part of transmission electrode portions and reception electrode portions illustrated in FIG. 1.

FIG. 5 is an enlarged schematic diagram illustrating a part of transmission electrode portions 11 and reception electrode portions 12 illustrated in FIG. 1. As illustrated in FIG. 5, each transmission electrode portion 11 has a plurality of electrodes 101 provided along the X axis direction, and a plurality of connection sections 101a that connect adjacent ones of the electrodes 101. Each reception electrode portion 12 has a plurality of electrodes 102 provided along the Y axis direction, and a plurality of connection sections 102a that connect adjacent ones of the electrodes 102.

The electrodes 101, 102 and the connection sections 101a, 102a are formed with transparent conductive films made of, for example, indium tin oxide (ITO) or indium zinc oxide (IZO). The connection sections 101a and the connection sections 102a, which intersect with each other, overlap each other, with an interlayer insulating film being interposed therebetween. Each portion between the adjacent ones of the electrodes 101 and the electrodes 102 functions as a capacitor.

Next, while referring to FIG. 1, the following description describes the configuration of the touch panel control unit 40.

The transmission circuit 410 includes a pulse generator 410a and a transmission electrode selector 410b. The transmission circuit 410 is connected with the transmission electrode portion 11 and the controller 400. The pulse generator 410a generates a pulse signal in synchronization with the timing signal output from the controller 400. The transmission electrode selector 410b includes switching elements that are respectively connected with the transmission electrode portions 11. The transmission electrode selector 410b selects the transmission electrode portions 11 sequentially by controlling each switching element, and supplies the pulse signal output from the pulse generator 410a, thereby driving the transmission electrode portions 11.

The reception circuit 420 includes a reception electrode selector 420a and a signal processor 420b, and is connected with the reception electrode portion 12 and the controller 400. The reception electrode selector 420a includes switching elements that are connected respectively with the reception electrode portions 12. The reception electrode selector 420a sequentially selects the reception electrode portions 12 by controlling each switching element, and outputs an output signal indicating a capacitance of a portion between the reception electrode portion 12 and the transmission electrode portion 11, from the reception electrode portion 12 to the signal processor 420b. The signal processor 420b amplifies the output signal from the reception electrode selector 420a and removes frequency components other than a predetermined frequency, then, performs a predetermined signal processing operation such as an operation of integrating the output signal and subjecting the same to the A/D conversion, thereby generating a digital signal indicating the capacitance of a portion between the transmission electrode portion 11 and the reception electrode portion 12, and outputting the same to the controller 400.

The controller 400 is connected with the transmission circuit 410, the reception circuit 420, and the display control unit 30. The controller 400 receives the horizontal synchronization signal from the display control unit 30. The controller 400 outputs a timing signal for outputting a pulse signal form the transmission circuit 410, at a timing when a predetermined time elapses from the point of time when the voltage of the horizontal synchronization signal falls, during each one horizontal scanning period (1H). The controller 400 detects contact of a conductive body and the contact position, based on a difference between the digital signal output from the reception circuit 420 indicating a capacitance and a capacitance when no conductive body is in contact with the touch panel 10.

A change occurs to the potential of the source line 202 or the like at a timing when a data signal is written in the display panel 20, and thereby capacitive coupling occurs between the source line 202 or the like and the transmission electrode portion 11 and the reception electrode portion 12 of the touch panel 10. This results in noise that causes the potentials of the transmission electrode portion 11 and the reception electrode portion 12 to change. In the present embodiment, therefore, preliminarily, the waveform of the noise that occurs on the surface of the display panel 20 due to the writing of a data signal is detected by an oscilloscope, and the timing when the noise occurs is detected. Then, the timing of generating the pulse signal is set initially in such a manner that the period when the noise occurs and the point of time when the voltage of the pulse signal output from the transmission circuit 410 changes should not coincide.

Figure 6:
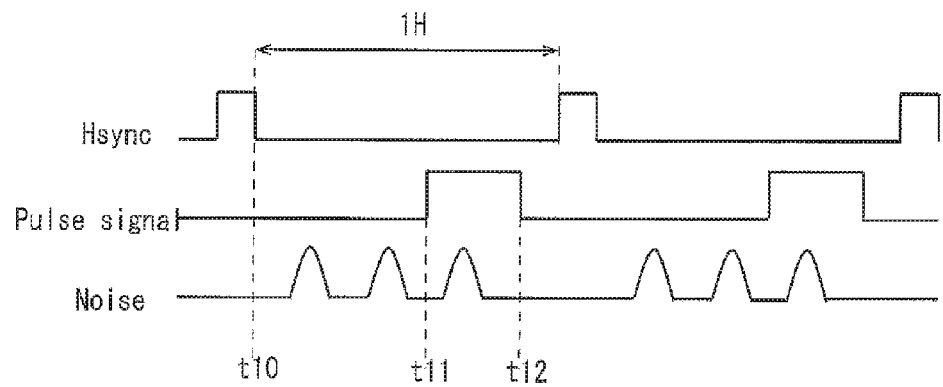
FIG. 6 illustrates exemplary waveforms of noise occurring to the display panel when data signals of R, G, and B are written, and a pulse signal.

More specifically, as illustrated in FIG. 6, when the data signals of R, G, and B are written during one horizontal scanning period (1H), noise of the display panel 20 occurs three times. The pulse signal is therefore generated from the transmission circuit 410 in such a manner that the point of time t11 when the voltage of the pulse signal rises from the Low level to the High level, and the point of time t12 when the voltage of the pulse signal falls from the High level to the Low level, should not coincide with the periods while noise occurs upon the writing of data signals of R, G, and B.

The point of time t11 when the voltage of the pulse signal rises from the Low level to the High level is a timing when the reference voltage of the pulse signal is fixed. Further, the point of time t12 when the voltage of the pulse signal falls from the High level to the Low level is a timing when charges in the reception electrode portion 12 are received by the reception circuit 420. Such a configuration that the points of times t11 and t12 when the voltage of the pulse signal output from the transmission circuit 410 changes and the period when noise of the display panel 20 occurs do not coincide makes it possible to detect a contact position on the touch panel 10, without being influenced by noise. In this case, therefore, the pulse signal is generated from the transmission circuit 410 at a timing when Δt (=t11−t10) elapses after the potential of the horizontal synchronization signal (Hsync) falls to the Low level. The controller 400 holes Δt (initial set value) as a delay value.

Figure 7:
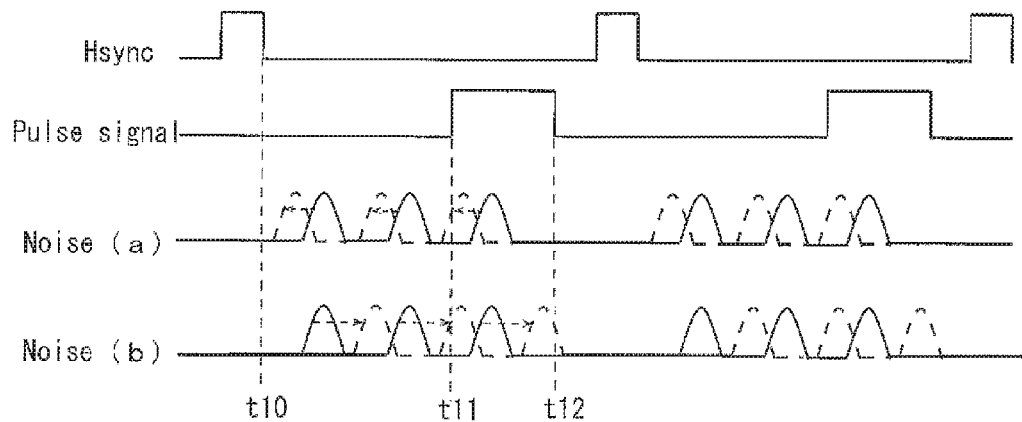
FIG. 7 illustrates exemplary waveforms of noise of the display panel in a case where timings of noise occurring to the display panel in the initial setting shift, and a pulse signal.

In some cases, after the timing when the pulse signal is generated from the transmission circuit 410 is initially set, a clock for driving the display panel 20 delays or advances, due to external factors such as a temperature change. Such an advance or a delay of the clock causes the timing when noise of the display panel 20 occurs advances or delays, as shown in, for example, the waveforms of noise (a) and noise (b) indicated by the broken lines in FIG. 7, ahead of or behind the timings when noise occur in the initial setting (solid lines). If the pulse signal is generated with the initial set value (Δt) in this state, the period when noise occurs, and the points of times t11 and t12 when the voltage of the pulse signal output from the transmission circuit 410 changes coincide, whereby the detection on the touch panel 10 is influenced by noise of the display panel 20.

The controller 400, therefore, determines whether or not the period when noise of the display panel 20 occurs and the point of time when the voltage of the pulse signal changes coincides, in other words, whether or not the detection on the touch panel 10 is influenced by noise of the display panel 20, based on the capacitance in one frame that is obtained by integrating the capacitances at the points of intersection (node) between the transmission electrode portions 11 and the reception electrode portions 12 detected every one horizontal scanning period (1H). In a case where the detection is influenced by noise of the display panel 20, the timing when the pulse signal is output from the transmission circuit 410 is adjusted.

FIGS. 8A to 8C illustrate exemplary data indicating mean values of capacitances in one frame at each point of intersection between the transmission electrode portions 11 and the reception electrode portions 12. Each set of data illustrated in FIGS. 8A to 8C indicates a standardized mean value of a capacitance in one frame at each point of intersection (nodes) between the transmission electrode portions 11 and the reception electrode portions 12, which are standardized based on a predetermined reference capacitance. Hereinafter, a standardized mean value of a capacitance in one frame at each point of intersection between the transmission electrode portions 11 and the reception electrode portions 12 is referred to as a node value, and node values in the entire touch panel 10 are referred to as plane data.

FIG. 8A illustrates exemplary plane data in a state in which no conductive body is in contact with the touch panel 10. In this case, a mean value of the plane data, which is obtained by dividing the sum of all of the node values by the number of nodes (hereinafter referred to as a plane mean value) is 3.

FIG. 8B illustrates exemplary plane data in a state in which a conductive body is in contact with a part of the touch panel 10. The part surrounded by thick lines in FIG. 8B is a part where a conductive body is in contact, and considerably high capacitances are detected at nodes in the part where a conductive body is in contact, as compared with the other nodes. The plane mean value in this case is 24.

FIG. 8C illustrates exemplary plane data in a state in which no conductive body is in contact with the touch panel 10, in a case of being influenced by noise of the display panel 20. As illustrated in FIG. 8O, in a case where the detection of a contact position on the touch panel 10 is influenced by noise of the display panel 20, the node values of approximate entirety of the touch panel 10 are higher, as compared with the case of FIG. 8A. The plane mean value in this case is 49.

In this way, in the state where a conductive body is in contact with the touch panel 10, the node values locally rise, but the plane mean value in this case is lower than the plane mean value in the case where no conductive body is in contact with the touch panel 10 and the detection is influenced by noise of the display panel 20.

In the present embodiment, the controller 400 records plane data of each frame, determines that the point of time when the voltage of the pulse signal changes coincides with the period when noise of the display panel 20 occurs, in a case where plane data in one frame satisfy predetermined conditions that are to be described below, and adjusts the timing when the pulse signal is generated from the transmission circuit 410 by advancing or delaying the timing as compared with the initially set timing. The following description describes an operation of adjusting the timings for generating the pulse signal from the transmission circuit 410 more specifically.

Figure 9:
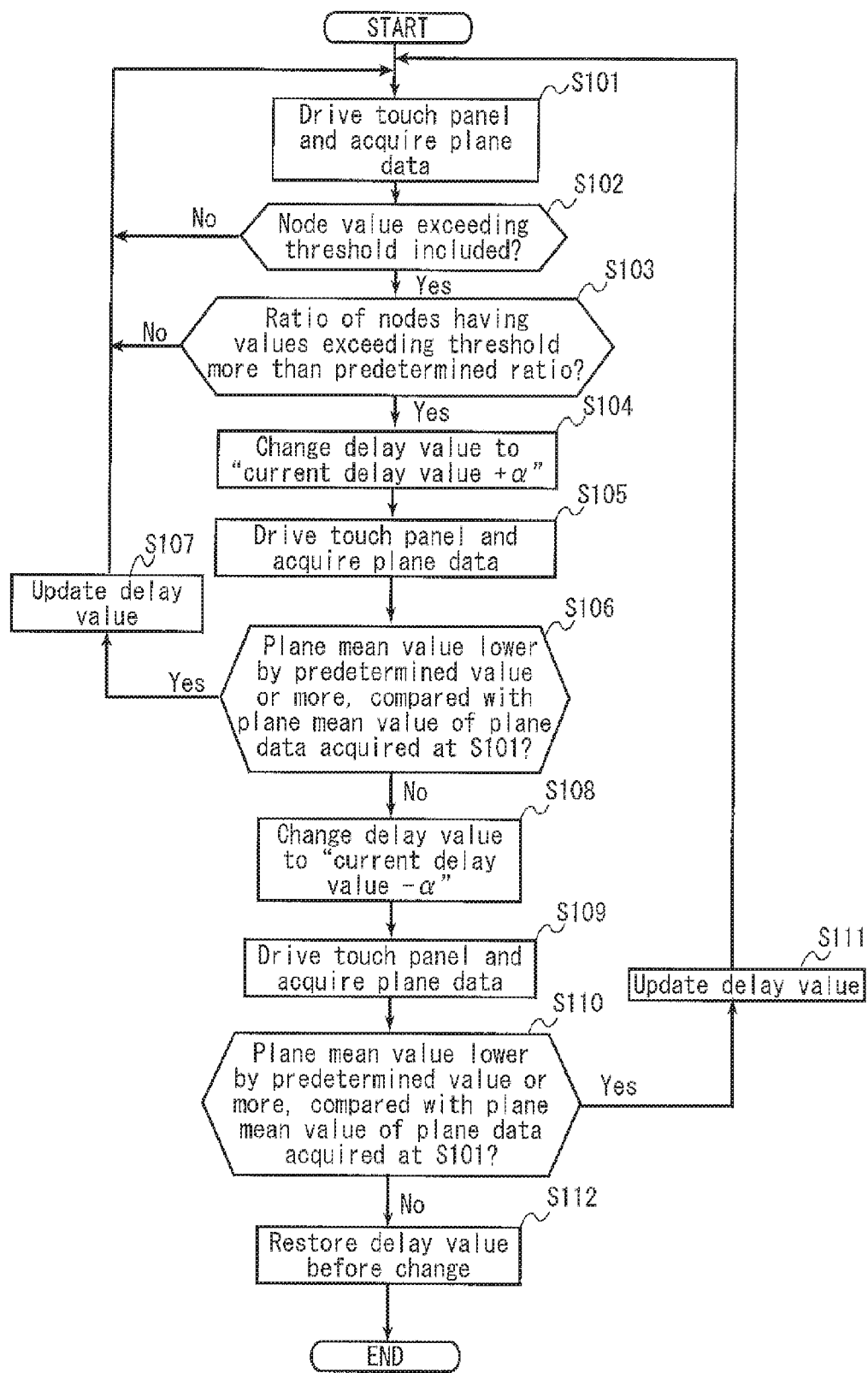
FIG. 9 is a flowchart illustrating an operation of adjusting the timing of generating the pulse signal.

FIG. 9 is a flowchart illustrating an operation of adjusting the timing when the pulse signal is generated from the transmission circuit 410. The controller 400 drives the touch panel 10 at a timing based on the horizontal synchronization signal supplied from the display control unit 30 and the delay value $\Delta t$, and acquires plane data in one frame (step S101). More specifically, the controller 400 supplies a timing signal to the transmission circuit 410 at a timing when the delay value ($\Delta t$) elapses from the supplied horizontal synchronization signal in each one horizontal scanning period (1H). The transmission circuit 410 supplies a pulse signal for driving the transmission electrode portion 11 to the transmission electrode portion 11 in synchronization with the timing signal from the controller 400. The reception circuit 420 outputs a digital signal to the controller 400, the digital signal being obtained by performing a predetermined signal processing operation with respect to an output signal indicating a capacitance at a point of intersection (node) between the transmission electrode portions 11 and the reception electrode portions 12, which is output from a selected one of the reception electrode portions 12. The controller 400 detects a contact position of a conductive body, based on the digital signals output from the reception circuit 420. The controller 400 integrates respective capacitances of the nodes detected in each one horizontal scanning period (1H), calculates a mean value of the capacitance of each node in one frame thereby determining a node value, and acquires plane data in one frame.

In a case where a node value outside the range of threshold values (for example, a range from 20 or more to 200 or less) is included in the plane data and the ratio of the node values outside the range of the threshold values included therein is at or over a predetermined ratio (for example, 70%) (steps S102, S103: Yes), the controller 400 determines that the detection is influenced by noise on the surface of the display panel 20, and performs the processing operations at and following to step S104. In other words, in this case, for example, as illustrated in (a) of FIG. 10, a state is assumed in which the point of time when the voltage of the pulse signal changes coincides with the period when noise of the display panel 20 occurs due to the writing of data signals. The range of the threshold values and the predetermined ratio described above can be arbitrarily set.

On the other hand, in a case where no node value outside the range of the threshold values is included in the plane data (step S102: No), or in a case where the ratio of node values outside the range of the threshold values included is not at or over the predetermined ratio (step S103: No), the controller 400 repeats the processing operation in steps S101 to S103.

In a case where noise of the display panel 20 occurs, the controller 400 drives the touch panel 10 by changing the delay value to a "current delay value+$\alpha$", thereby acquiring the plane data (steps S104, S105). In other words, in a case where the current delay value is the initial set value ($\Delta t$), as illustrated in (b) of FIG. 10, the controller 400 outputs the pulse signal from the transmission circuit 410 to the transmission electrode portion 11, at a timing when ($\Delta t + \alpha$) elapses from the horizontal synchronization signal. Then, the controller 400 calculates a mean value of the capacitance of each node in one frame based on the digital signal output from the reception circuit 420 so as to determine each node value, thereby acquiring plan data in one frame. It should be noted that $\alpha$ is a value that can be set arbitrarily, and in a case where one horizontal scanning period is, for example, 10 $\mu$sec, $\alpha$ may be set to a value in a range of 50 nsec to 100 nsec.

The controller 400 calculates a plane mean value of the plane data acquired at step S105, and calculates a plane mean value of the plane data of the frame acquired at step S101. Then, the controller 400 determines whether or not the plane mean value of the plan data acquired at step S105 is lower by a predetermined value or more (for example, 5 or more), as compared with the plane mean value of the previous frame (step S106).

In a case where the plane mean value of the plane data acquired at step S105 is lower by a predetermined value or more, as compared with the plane mean value in the frame acquired at step S101 (step S106: Yes), the controller 400 updates the delay value changed at step S104, and repeats the operation at and following to step S101 (step S107).

Further, in a case where the plane mean value of the plane data acquired at step S105 is not lower by the predetermined value or more, as compared with the plane mean value in the frame acquired at step S101 (step S106: No), the controller 400 drives the touch panel 10 by changing the delay value to the "current delay value-$\alpha$", and acquires plane data (steps S108, S109). In other words, in a case where the current delay value is the initial set value ($\Delta t$), as illustrated in (c) of FIG. 10, the controller 400 transmits the pulse signal from the transmission circuit 410 to the transmission electrode portion 11 at a timing when ($\Delta t - \alpha$) elapses from the horizontal synchronization signal, and acquires plane data in one frame by using respective capacitances of the nodes detected by the reception circuit 420 every one horizontal scanning period.

The controller 400 calculates a plane mean value of the plane data acquired at step S109, and at the same time, calculates a plane mean value of the plane data in the frame acquired at step S101. Then, the controller 400 determines whether or not the plane mean value of the plane data acquired at step S109 is lower by a predetermined value or more (for example, 5 or more), as compared with the plane mean value in the frame acquired at step S101 (step S110).

In a case where the plane mean value of the plane data acquired at step S109 is lower by a predetermined value or more, as compared with the plane mean value in the frame acquired at step S101 (step S110: Yes), the controller 400 updates the delay value changed at step S108, and repeats the operation at and following to step S101 (step S111). By performing the above-described operation in this way, the noise on the surface of the display panel 20 due to the writing of data signals can be improved continuously in a stepwise manner.

On the other hand, in a case where the plane mean value of the plane data acquired at step S109 is not lower by the predetermined value or more, as compared with the plane mean value in the frame acquired at step S101 (step S110: Yes), the controller 400 restores the delay value before the change (step S112). In a case where the plane mean value does not fall even if the timing when the pulse signal is output from the transmission circuit 410 is advanced or delayed, it is considered that noise different from the noise on the surface of the display panel 20 due to the writing of data signals would influence. In this case, the delay value is restored to the delay value before the change.

In the embodiment described above, the driving of the display panel 20 and the driving of the touch panel 10 in one horizontal scanning period (1H) are performed in parallel, without time division. Further, when the touch panel 10 is driven, the timing of generating the pulse signal to be supplied to the transmission electrode portion 11 of the touch panel 10 is adjusted, so that the driving of the touch panel 10 should not be influenced by noise occurring on the surface of the display panel 20 due to the writing of data signals. The detection of a contact position on the touch panel 10, therefore, is not influenced by noise of the display panel 20 due to the writing of data signals even if the display panel 20 and the touch panel 10 are driven in parallel, whereby false detection of a contact position can be prevented. Further, since the timing of driving the display panel 20 is not limited, the high-definition display panel 20 can be used, without an increase in labor hours needed for the development.

Modification Example

An embodiment of the present invention is described above, but the present invention is no limited to the above-described embodiment. Aspects of the following modification examples and aspects of the combinations of the modification examples are also encompassed in the scope of the present invention.

(1) Though the foregoing embodiment is described with reference to an example in which the writing of data signals is carried out by SSD, the configuration may be such that all of the source lines 202 are constantly connected with the source driver 320, and data signals of R, G, and B are supplied simultaneously to the source lines 202 corresponding thereto, respectively. In this case, noise of the display panel 20 due to the writing of data signals occurs once in one horizontal scanning period (1H). The delay value, therefore, may be adjusted in such a manner that the point of time when the voltage of the pulse signal changes does not coincide with the period when this noise occurs, as is the case with the above-described embodiment.

(2) Though the foregoing embodiment is described with reference to an example in which the display panel 20 is a liquid crystal panel, the display panel may be a display panel in which organic electroluminescence (EL) or the like is used.

DESCRIPTION OF REFERENCE NUMERALS

1: touch-panel-equipped display device
10: touch panel
11: transmission electrode portion
12: reception electrode portion
20: display panel
30: display control unit
40: touch panel control unit
101, 102: electrode
101a, 102a: connection section
201: gate line
201: source line
213: switch
300, 400: controller
310: gate driver
320: source driver
330: source line selector
410a: pulse generator
410b: transmission electrode selector
420a: reception electrode selector
420b: signal processor
DP: display part
TP: touch panel part

The invention claimed is:

1. A touch-panel-equipped display device comprising:
a display panel including a plurality of gate lines and a plurality of data lines that intersect with each other;
a display control unit that sequentially selects the gate lines, and supplies data signals to the data lines;
a touch panel that is arranged so as to be stacked on the display panel, and includes a plurality of transmission electrodes and a plurality of reception electrodes that intersect with each other;
a pulse supply unit that supplies a pulse signal to the transmission electrodes at timings based on a horizontal synchronization signal;
a detection unit that detects capacitances between the transmission electrodes and the reception electrodes, and detects a contact position on the touch panel based on the detected capacitances; and
an adjustment unit that adjusts the timings so that a point of time when a voltage of the pulse signal changes should not coincide with a period when the noise of the display panel occurs due to the supply of the data signals;
wherein the adjustment unit detects that the point of time when the voltage of the pulse signal changes coincides with the period when the noise of the display panel occurs, based on the capacitances detected by the detection unit, and adjusts the timings.

2. The touch-panel-equipped display device according to claim 1,
wherein, in a case where a ratio of mean values of capacitances exceeding a threshold value among those at points of intersections between the transmission electrodes and the reception electrodes in one frame is equal to or more than a predetermined ratio, the adjustment unit detects that the point of time when the voltage of the pulse signal changes coincides with the period when the noise of the display panel occurs, and advances or delays the timings by a certain time.

3. The touch-panel-equipped display device according to claim 1,
wherein the data signals are data signals each of which corresponds to any one of a plurality of colors, and
the display control unit supplies the data signals of the plurality of colors in such a manner that the data signals in one horizontal scanning period are time-divided depending on the color.

4. The touch-panel-equipped display device according to claim 1,
wherein the display panel is a liquid crystal panel.

* * * * *